United States Patent [19]

Kihara

[11] 3,740,495

[45] June 19, 1973

[54] MAGNETIC RECORDING AND/OR REPRODUCING APPARATUS WITH AUTOMATIC TAPE LOADING AND UNLOADING DEVICE

[75] Inventor: Nobutoshi Kihara, Tokyo, Japan

[73] Assignee: Sony Corporation, Tokyo, Japan

[22] Filed: Feb. 9, 1971

[21] Appl. No.: 113,988

[30] Foreign Application Priority Data

Feb. 14, 1970 Japan ............................... 45/12887
Feb. 14, 1970 Japan ............................... 45/12888

[52] U.S. Cl... 179/100.2 T, 179/100.2 ZA, 274/4 B
[51] Int. Cl......................... G11b 5/52, G11b 23/08
[58] Field of Search ............ 179/100.2 T, 100.2 Z; 226/491, 86, 195; 242/55.11, 55.12, 55.13, 55.16; 274/4 B, 4 C, 11 B, 11 C, 11 D

[56] References Cited

UNITED STATES PATENTS

| | | | |
|---|---|---|---|
| 3,678,213 | 7/1972 | Sato | 179/100.2 Z |
| 3,673,348 | 6/1972 | Larkin | 179/100.2 Z |
| 3,647,984 | 3/1972 | Watanabe | 179/100.2 Z |
| 3,674,942 | 7/1972 | Sugaya | 179/100.2 Z |
| 3,612,539 | 10/1971 | Bragas | 274/4 C |

FOREIGN PATENTS OR APPLICATIONS

| | | | |
|---|---|---|---|
| 1,537,240 | 10/1969 | Germany | 179/100.2 T |

OTHER PUBLICATIONS

IBM Tech. Disc. Bulletin, Jan. 67, V9 N8, p. 963 "Automatic Tape Threading" - Johnson, RB.

*Primary Examiner*—Bernard Konick
*Assistant Examiner*—Jay P. Lucas
*Attorney*—Alvin Sinderbrand and Curtis, Morris & Safford

[57] ABSTRACT

A magnetic recording and reproducing apparatus of the type having a tape guide drum and at least one rotary head to scan a tape wrapped on the drum is provided with a device for automatically wrapping the tape on the guide drum, for example, from a cassette or cartridge containing the tape. Such device has a rotatable support, in the form of a ring, extending around the drum and carrying guides, and a tape engaging member also mounted on the ring and being movable into and out of a guide path spaced from the drum and defined by the guides. The tape engaging member, in an inactive condition of the apparatus, is displaced out of the guide path to engage the tape in the cassette or cartridge, and is moved into the guide path upon turning of the ring to draw a loop of the tape from the cassette or cartridge and to wrap one side of the loop about the guide drum while the other side of the loop is engaged by the guides and maintained in the corresponding guide path.

35 Claims, 19 Drawing Figures

Patented June 19, 1973 3,740,495

7 Sheets-Sheet 1

INVENTORS

NOBUTOSHI KIHARA

BY

ATTORNEY

INVENTORS
NOBUTOSHI KIHARA
BY [signature]
ATTORNEY

INVENTORS
NOBUTOSHI KIHARA

BY [signature]

ATTORNEY

Patented June 19, 1973 3,740,495

7 Sheets-Sheet 4

INVENTORS
NOBUTOSHI KIHARA

BY Louis H. Eslinger
ATTORNEY

INVENTORS
NOBUTOSHI KIHARA
BY
ATTORNEY

INVENTORS
NOBUTOSHI KIHARA
BY
Louis H. Eplinger
ATTORNEY

INVENTORS

NOBUTOSHI KIHARA

BY Lewis H. Eslinger

ATTORNEY

MAGNETIC RECORDING AND/OR REPRODUCING APPARATUS WITH AUTOMATIC TAPE LOADING AND UNLOADING DEVICE

This invention relates generally to magnetic recording and reproducing apparatus, such as, video tape recorders (VTR), and more particularly is directed to an improved automatic tape loading device for such apparatus.

Generally, a VTR comprises one or more rotary magnetic heads operative to record or reproduce signals on a magnetic tape as the latter is wrapped about a guide drum and driven by a capstan, pinch roller and take-up reel.

In order to operate a VTR, the tape must be placed around or wrapped on the drum for guiding the tape with respect to the rotary magnetic head or heads. Generally, the user must manually thread the tape from a supply reel past various guides on the VTR chassis, around the guide drum and thence back to the take-up reel. This operation requires a considerable degree of manual dexterity and can be time consuming. If the tape is not properly threaded, it can jam the mechanism and, if the operator's fingers have any foreign matter thereon, it can be passed to the tape and adversely affect its fidelity.

Automatic tape loading devices have been suggested in order to overcome the aforementioned disadvantages. However, such devices have not been fully satisfactory in that they are prone to electrical and mechanical failures or malfunctioning, or involve the use of mechanisms which are complicated, difficult to manufacture and expensive. Further, the previuosly proposed automatic tape loading devices are cumbersome and space consuming, and thus are not adapted for use in compact VTRs.

Accordingly, it is an object of this invention to provide a magnetic recording and reproducing apparatus of the described type, such as, a video tape recorded (VTR), with an automatic tape loading device which avoids all of the foregoing disadvantages of the previously proposed tape loading devices.

More specifically, it is an object of this invention to provide an automatic tape loading device which is relatively simple in construction and operation, and which functions reliably to effect the desired wrapping of the magnetic tape on the tape guide drum.

Another object is to provide an automatic tape loading device which is operative to reliably wrap the tape helically on the tape guide drum so that the rotary magnetic head or heads associated with the guide drum will scan skewed tracks on the tape.

Still another object is to provide an automatic tape loading device that may be used in connection with a magnetic recording and reproducing apparatus employing magnetic tape which is contained in a cassette or cartridge.

A further object is to provide a magnetic recording and reproducing apparatus of the described type having an automatic loading device and which is adapted to operate with cassettes or cartridges of various sizes.

In accordance with an aspect of this invention, an automatic tape loading device for a magnetic recording and reproducing apparatus of the described type comprises a rotatable support, for example, in the form of a ring, extending around the guide drum and carrying a plurality of guides, and a tape engaging member also mounted on the ring or support member and being movable into and out of a guide path which is defined by the guides and spaced from the surface of the guide drum. The tape engaging member, is an inactive condition of the apparatus, is displaced out of the guide path to engage the magnetic tape between the supply and take-up reels which may be congained in a cassette or cartridge, and, upon turning of the ring, the tape engaging member is moved into the guide path to draw a loop of the tape from the cassette or cartridge and to wrap one side of the loop about the guide drum while the other side of the loop is engaged by the guides and maintained in the corresponding guide path spaced from the periphery of the drum.

The above, and other objects, features and advantages of the invention, will be apparent from the following detailed description of an illustrative embodiment thereof which is to be read in connection with the accompanying drawings, wherein.

Figure 1:
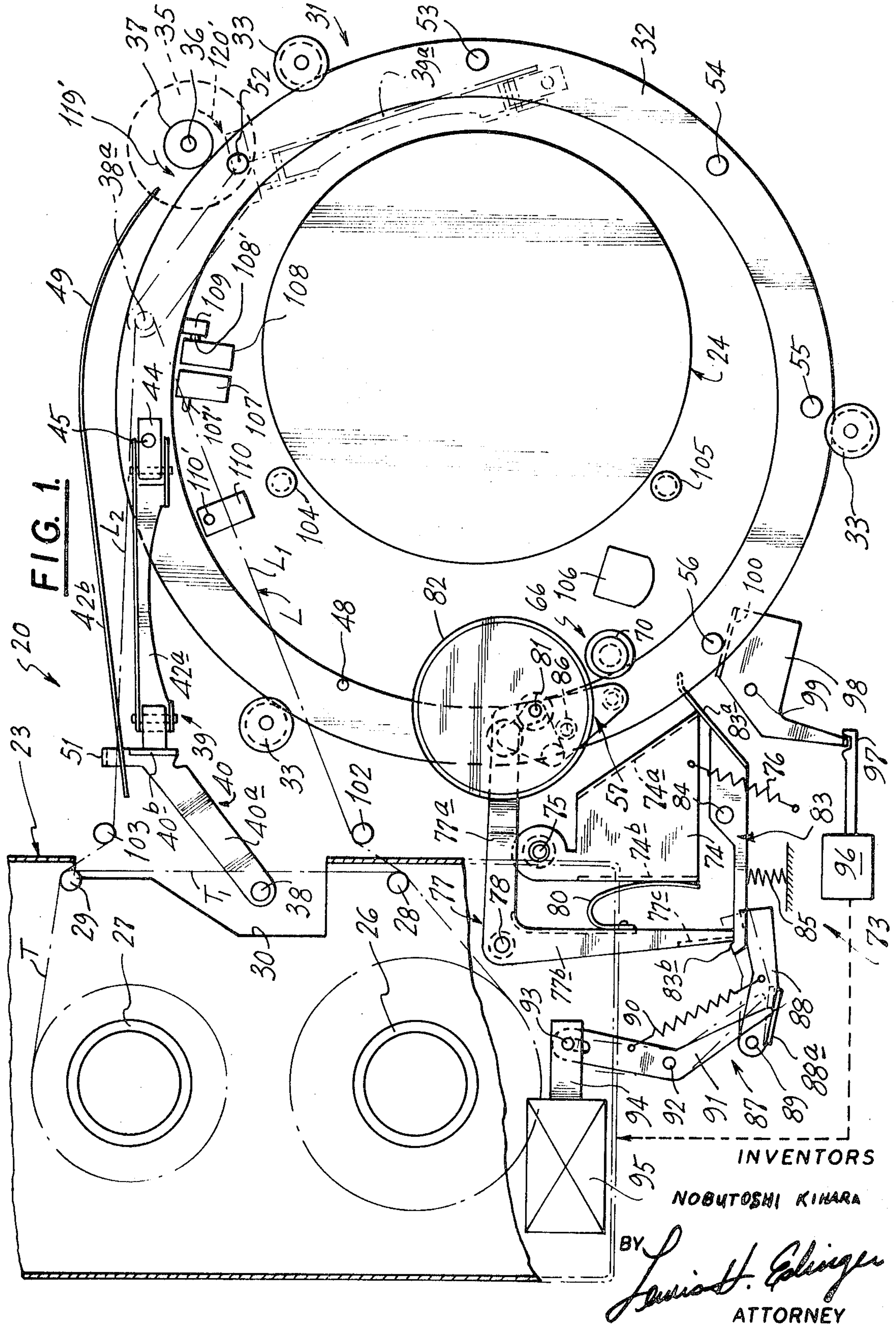
FIG. 1 is a schematic top plan view of an automatic tape loading device according to this invention for a magnetic recording and reproducing apparatus, and which is shown in full lines in the inactive condition of such apparatus.
Figure 2:
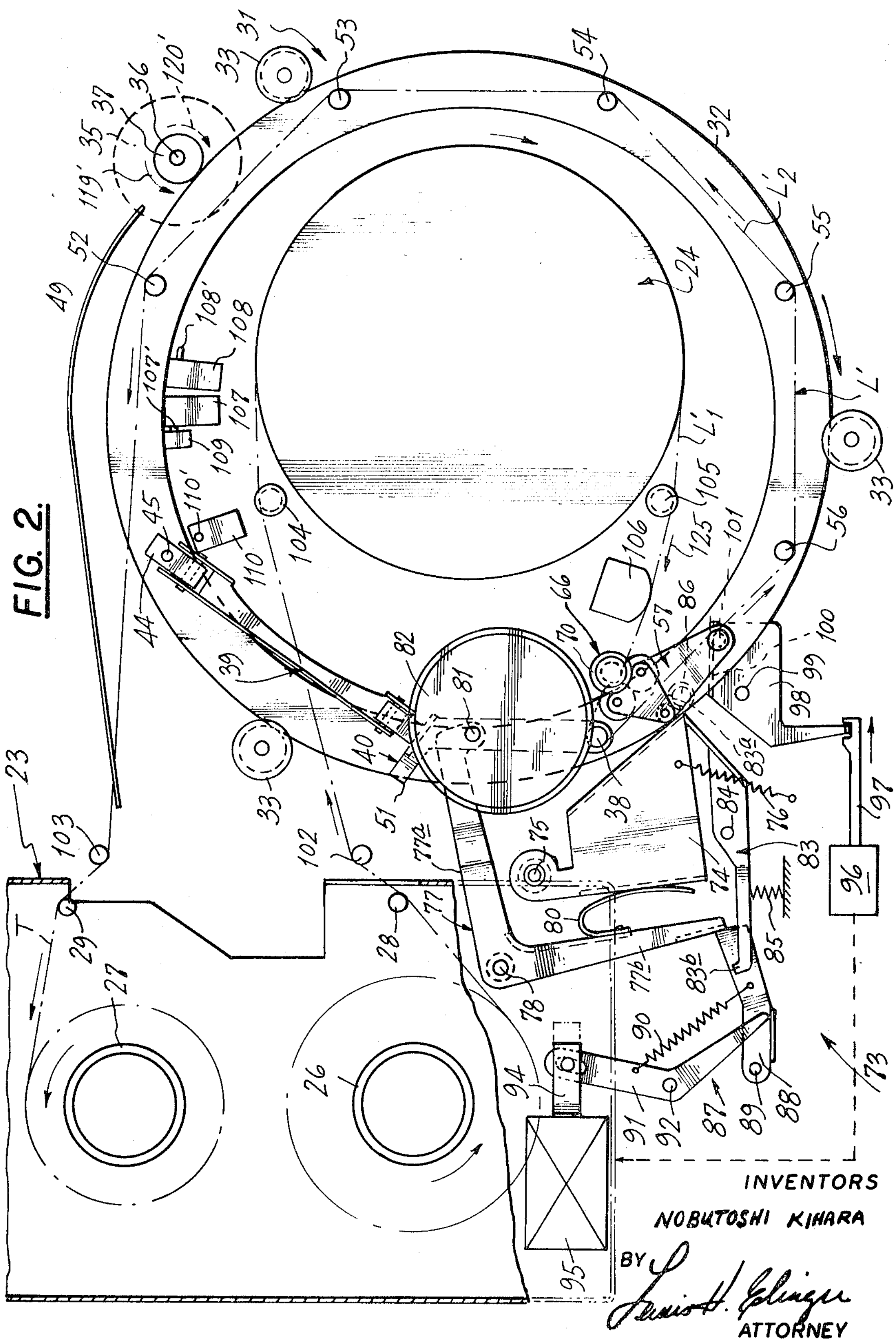
FIG. 2 is a view similar to that of FIG. 1, but showing the tape loading device in the operative condition of the apparatus.
Figure 3:
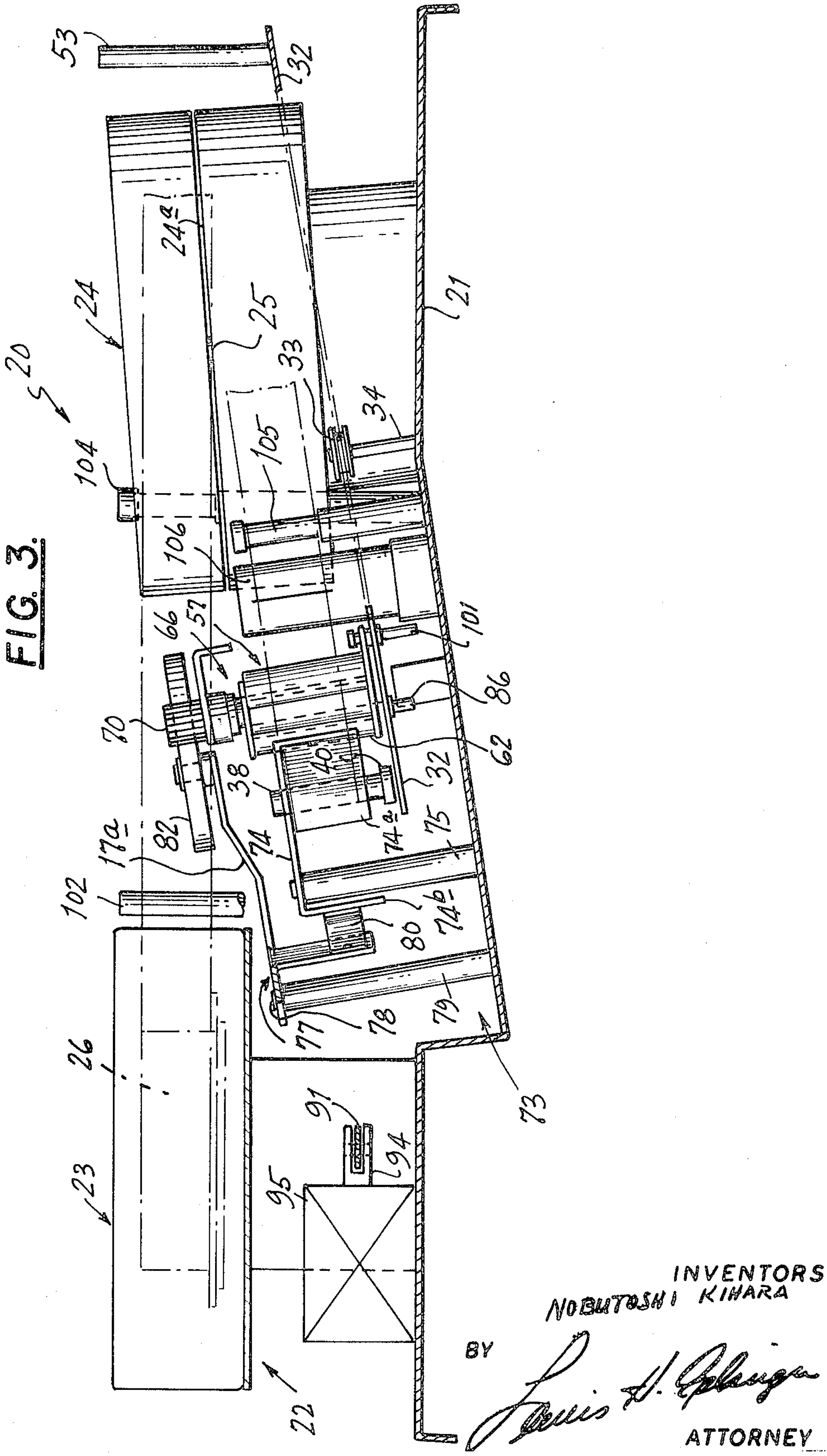
FIG. 3 is a schematic side elevational view of the apparatus in the operative condition thereof indicated on FIG. 2.

Referring to the drawings in detail, and initially to FIGS. 1, 2 and 3 thereof, it will be seen that an automatic tape loading device according to an embodiment of this invention is there shown applied to a cassette-type VTR, but it should be understood that the invention is equally applicable to any other magnetic recording and reproducing apparatus in which the magnetic tape is carried by supply and take-up reels and it is necessary to draw the tape from between such reels and wrap the tape about a guide drum having a magnetic head or heads associated therewith for scanning the tape guided by the drum.

The cassette-type VTR shown in the drawings is generally identified by the reference numeral 20 and comprises a chassis 21 having a cassette holder 22, which is merely indicated schematically on FIG. 3 and hereinafter described in detail, mounted above the forward portion of chassis 21 to receive and support a cassette 23 containing a supply of magnetic tape. The apparatus 20 is further shown to comprise a tape guide drum 24 suitably mounted above the back portion of chassis 21 and defining a circumferential slot 24*a* (FIG. 3) in which one or more rotary magnetic heads 25 are exposed to scan the magnetic tape when the latter is wrapped about a predetermined extent of the periphery of drum 24.

The magnetic tape T is shown to be wound on a supply reel 26 and take-up reel 27 which are rotatable within cassette 23, and the tape T extends over guide pins 28 and 29 which are disposed at opposite sides of an opening 30 provided at the back portion of cassette 23 so that a run $T_1$ of the tape extending between reels 26 and 27 will be exposed at cassette opening 30, as shown on FIG. 1.

The automatic tape loading device according to this invention is generally identified by the numeral 31 and shown to comprise a support member 32, for example, in the form of a circular ring which extends around drum 24. The ring 32 is supported for rotation about its center, for example, by a number of grooved rollers or pulleys 33 which engage the periphery of ring 32 at locations spaced apart about the latter and which are rotatably supported on posts 34 (FIG. 3) extending upwardly from chassis 21. Preferably, as shown on FIG. 3, support ring 32 is mounted so that its plane of rotation slopes downwardly in the forward direction below the plane of rotation of reels 26 and 27. Further, as shown, drum 24 is also preferably mounted so that the plane of rotation of magnetic head or heads 25 in circumferential slot 24*a* is below the level of the reels 26 and 27 in the cassette, and further so that the plane of rotation of heads 25 also slopes downwardly in the forward direction so as to substantially bisect the angle included between the plane of rotation of the reels and the plane of rotation of support ring 32. As is shown particularly on FIG. 1, the cassette 23 is preferably laterally offset with respect to the axis of drum 24, and ring 32 is eccentrically located with respect to drum 24 so that the center of rotation of ring 32 is displaced forwardly, that is, in the direction toward cassette 23, from the axis of drum 24.

Support ring 32 is turned by a reversible D.C. electric motor 35 (shown in broken lines on FIGS. 1 and 2) which is suitably mounted at the underside of chassis 21 and has its shaft 36 extending upwardly through an opening in the chassis adjacent the periphery of ring 32 and carrying a rubber-surfaced drive roller 37 which frictionally engages the periphery of the ring. Thus, by suitable control of motor 35, as hereinafter described in detail, support ring 32 can be turned in the clockwise or tape loading direction from its inactive position shown on FIG. 1 to its operative position shown on FIG. 2, and, similarly, for unloading the tape, ring 32 can be turned in the counterclockwise direction from its operative position shown on FIG. 2 to its initial or inactive position shown on FIG. 1.

Figures 4, 5, 6, 7, 8:
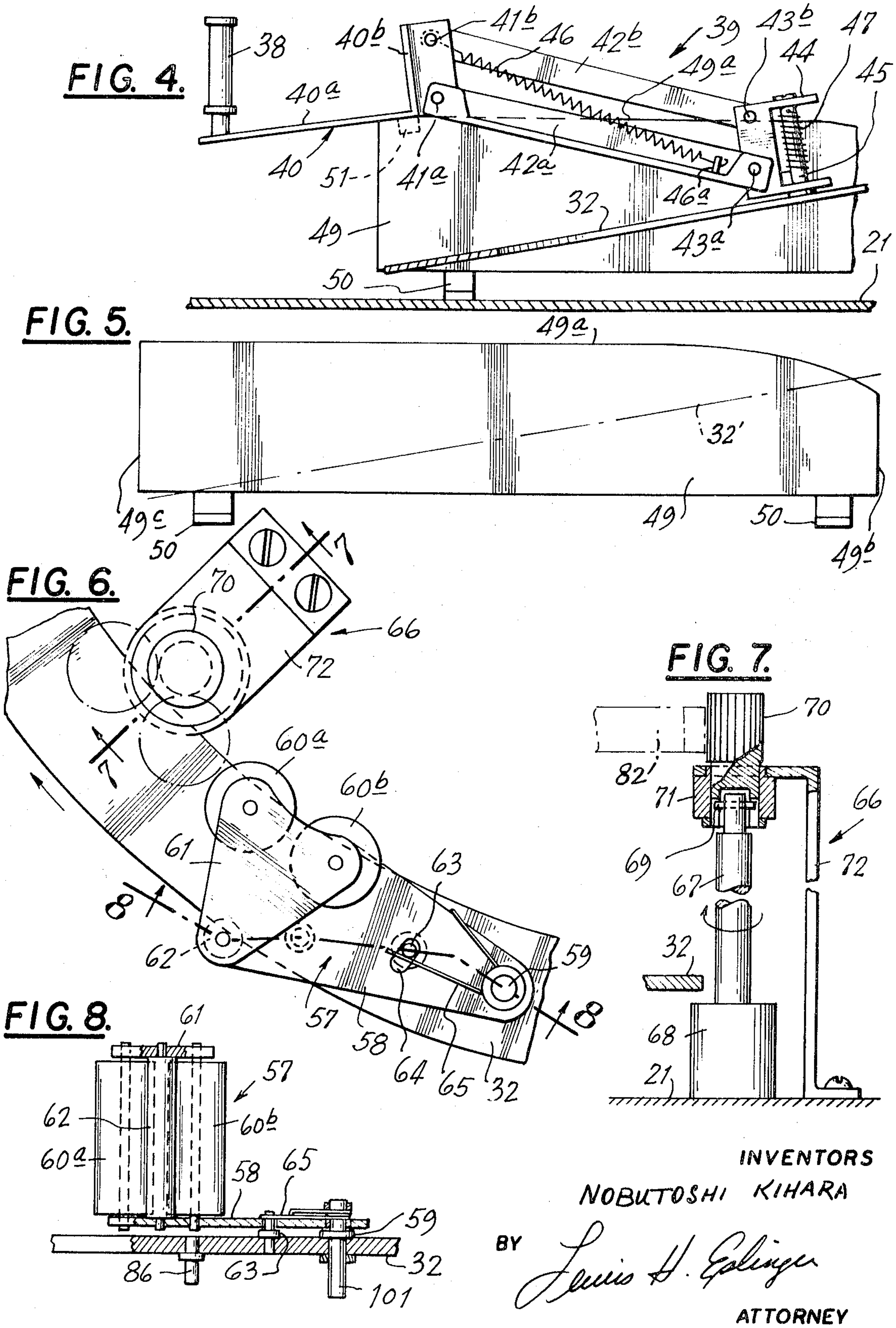
FIG. 4 is a side elevational view of an arm assembly for supporting a tape engaging member of the tape loading device.
FIG. 5 is an elevational view of a cam included in the automatic tape loading device.
FIG. 6 is a fragmentary enlarged plan view showing the arrangment of a capstan and a pinch roller assembly in the apparatus having a tape loading device according to this invention.
FIG. 7 is a sectional view taken along the line 7—7 on FIG. 6.
FIG. 8 is a sectional view taken along the line 8—8 on FIG. 6.

A tape engaging member 38 which is preferably in the form of an upstanding, rotatable flanged pin or roller is mounted, by way of an arm assembly 39, on support ring 32 so as to move with the latter during turning of the support ring while being movable relative to ring 32 both in the directions generally toward and away from the center of rotation of the ring and in directions generally perpendicular to the plane of rotation of ring 32. As shown on FIGS. 1 and 4, the arm assembly 39 may include an L-shaped bracket 40 having an arm 40*a* that extends generally parallel to the plane of rotation of ring 32 and that has the tape engaging member 38 extending upwardly from its free end portion, and an upstanding arm 40*b* to which vertically spaced pivot pins 41*a* and 41*b* are suitably secured. Generally parallel arms or links 42*a* and 42*b* are pivotally connected, at one end, to pins 41*a* and 41*b*, respectively, and the opposite ends of such arms or links 42*a* and 42*b* are mounted on pivot pins 43*a* and 43*b* respectively, which are vertically spaced from each other in a bracket 44. Bracket 44 is swingable on a pivot 45 carried by support ring 32 and extending generally perpendicular to the plane of rotation of the latter. It will be apparent that swinging of the parallel arms or links 42*a* and 42*b* about pivot pins 43*a* and 43*b* permits upward and downward movement of tape engaging member 38, that is, movement in directions generally perpendicular to the plane of rotation of ring 32 with the tape engaging member 38 remaining substantially erect during such movement, whereas swinging of bracket 44 about pivot 45 permits movement of tape engaging member 38 outwardly away from ring 32, for example, to the position shown on FIG. 1, or inwardly to a position above ring 32, for example, as shown on FIG. 2.

As shown on FIGS. 1 and 2, the arm 40*a* of bracket 40 is angled laterally with respect to the arms or links 42*a* and 42*b* so that, when tape engaging member 38 is in the position shown on FIG. 2 above ring 32, arm assembly 39 will approximately conform to the curvature of the ring therebelow. As shown particularly on FIG. 4, a tension spring 46 extends diagonally between links 42*a* and 42*b*, for example, from the pivot pin 41*b* to an anchor 46*a* provided on link 42*a* adjacent pivot pin 43*a* for yieldably urging links 42*a* and 42*b* to swing downwardly toward ring 32. A torsion spring 47 is provided around the pivot pin 45 and has its opposite ends secured to that pivot pin and bearing against bracket 44 for yieldably urging arm assembly 39 to swing about pivot pin 45 in the counterclockwise direction, as viewed on FIG. 1, that is, to yieldably urge tape engaging member 38 to the position above ring 32, as shown on FIG. 2. The swinging of arm assembly 39 under the urging of spring 47 may be limited by a stop 48 (FIG. 1) extending upwardly from ring 32 and being engageable by the arm 40*a*, while the downward swinging of the arm assembly under the urging of spring 46 is limited by the engagement of link 42*a* and bracket 40 with the upper surface of ring 32.

In order to dispose tape engaging member 38 in the position shown on FIG. 1 when ring 32 is in its inactive position, that is, in order to raise arm assembly 39 and swing the latter outwardly relative to ring 32, the tape loading device 31 further includes an arcuate cam plate 49 mounted on brackets 50 (FIGS. 4 and 5) supported by chassis 21 so as to extend along a portion of cam ring 32 and to diverge forwardly from the latter to adjacent the cassette 23. A bent tab 51 (FIGS. 1, 2 and 4) extends outwardly and then downwardly from bracket 40 adjacent arm 40*b* of the latter, and is slidably engageable over the top edge 49*a* of cam plate 49 to act as a cam follower. As shown on FIG. 5, the edge 49*a* of cam plate 49 is shaped to extend upwardly with respect to the plane of rotation of ring 32 (indicated by the broken line 32′ on FIG. 5) in the direction from the end 49*b* of cam plate 49 which is remote from cassette 23 to the end 49*c* of the cam plate adjacent the cassette. Thus, during turning of ring 32 in the counterclockwise direction from the position of FIG. 2 to the inactive position of FIG. 1, bent tab 51 acting as a cam follower comes into engagement with the top edge 49*a* of cam plate 49 at the end 49*b* thereof and thereafter moves along edge 49*a* toward the end 49*c* of the cam plate for both raising arm assembly 39 against the force of spring 46 and for swinging the arm assembly outwardly away from ring 32 against the force of spring 47. When ring 32 is disposed in its inactive position shown on FIG. 1, cam plate 49 positions arm assembly 39 so that the tape engaging member 38 carried by the latter will extend upwardly into opening 30 at the back of cassette 23 and be disposed in front of the run $T_1$ of the tape which extends between guide pins 28 and 29 and is exposed at the cassette opening. Of course, it is intended that tape engaging member 38 sould be disposed at the position shown on FIG. 1 prior to the positioning of the cassette 23 on holder 22 at the level indicated on FIG. 3, and further that the cassette 23 should be moved downwardly from above to the level shown on FIG. 3, for example, by the operation of holder 22 as hereinafter described in detail, whereby the downward movement of the cassette results in the entry of tape engaging member 38 into cassette opening 30.

Support ring 32 further carries a series of guide pins 52, 53, 54, 55 and 56 which extend upwardly from the ring at spaced apart locations along approximately the half of ring 32 which is diametrically opposed to that portion of the ring along which arm assembly 39 extends when it is in overlying relation to the ring as shown on FIG. 2. The guide pins 52–56 define a guide path spaced from the periphery of drum 24 and are engageable by the tape, as hereinafter described, when device 31 is operated to wrap a portion of the tape on a predetermined peripheral extent of drum 24.

Also mounted on support ring 32 between guide pin 56 and the location of tape engaging member 38 when the latter is disposed above ring 32, as on FIG. 2, is a pinch roller assembly 57 (FIGS. 1–3, 6 and 8). As shown particularly on FIGS. 6 and 8, pinch roller assembly 57 may include a lever arm 58 pivoted at one end on a pivot pin 59 carried by ring 32 and the other end portion of arm 58 supports the lower ends of upstanding pinch rollers 60*a* and 60*b* which face toward the inside of ring 32 and have their upper ends joined by a cross plate 61. Disposed outwardly with respect to pinch rollers 60*a* and 60*b* is a bearing roller 62 which is secured, at its upper and lower ends, to cross plate 61 and lever arm 58. Swinging of lever arm 58 relative to ring 32 is suitably limited, as by a pin 63 fixed to ring 32 and engaging in a laterally elongated slot 64 formed in lever arm 58. Lever arm 58 is yieldably urged outwardly with respect to ring 32 to the limit of such outward movement permitted by the coaction of pin 63 and slot 64, for example, as by a torsion spring 65 which extends around pivot pin 59 and has its opposite end portions bearing against an edge of lever arm 58 and pin 63.

A capstan assembly 66 (FIGS. 1–3, 6 and 7) is disposed inside the circular path of travel of ring 32 and located so that pinch rollers 60*a* and 60*b* will be adjacent thereto when ring 32 is turned to its operative position (FIG. 2). As shown particularly on FIG. 7, capstan assembly 66 includes a capstan 67 journalled in a bearing 68 mounted on chassis 21 and being rotated by a motor (not shown) disposed underneath the chassis. The upper end of capstan 67 is rotatably coupled, as by a coupling 69, with a drive roller 70 having a grooved surface and being journalled in a bearing 71 which is supported by a racket 72 extending upwardly from chassis 21.

The illustrated tape loading device 31 further comprises a pressing assembly 73 (FIGS. 1,2 and 3) which, as hereinafter described in detail, is operative to press pinch rollers 60*a* and 60*b* against capstan 67 with the tape therebetween upon the attainment by ring 32 of its operative position shown on FIG. 2. The assembly 73 is shown to include a pressing member 74 located outside of the path of travel of ring 32 and being pivotally mounted on a pin 75 carried by chassis 21 (FIG. 3) for swinging toward and away from ring 32. At its side facing toward ring 32, pressing member 74 has a flange 74*a* which, when ring 32 is in is operative position (FIG. 2) and pressing member 74 is rocked in the direction toward ring 32, engages bearing roller 62 of pinch roller assembly 57 to rock lever arm 58 against the force of spring 65 and thereby move pinch rollers 60*a* and 60*b* against capstan 67. A spring 76 is connected to pressing member 74 to urge the latter to the position shown on FIG. 1 where its flange 74*a* is spaced from the path of travel of pinch roller assembly 57 with ring 32. A bell crank 77 is pivotally mounted, intermediate its right angled arms 77*a* and 77 *b,* on a pivot pin 78 carried by a post 79 (FIG. 3) extending upwardly from chassis 21. A leaf spring 80 extends from bell crank arm 77*b* and is engageable with a flange 74*b* formed on the side portion of pressing member 74 facing away from ring 32 so that, when bell crank 77 is rocked in the counterclockwise direction, for example, from the position shown on FIG. 1 to the position shown on FIG. 2, leaf spring 80 acts on flange 74*b* of pressing member 74 to pivot the latter toward ring 32 against the force of spring 76. The other arm 77*a* of bell crank 77 extends above the path of ring 32 and, at its free end, supports an axle 81 on which a rubber tired wheel 82 is eccentrically rotatable at the level of the grooved drive roller 70 which is coupled with the capstan 67 (FIG. 3). By reason of its eccentric mounting, wheel 82 has diametrically opposed peripheral portions which are respectively at maximum and minimum distances from its axis of rotation and peripheral portions therebetween of progressively decreasing distances from the axis of rotation defined by axle 81.

Assembly 73 is further shown to include a first latch device 83 in the form of a latch lever which is pivoted intermediate its ends, as at 84, and which is urged by a spring 85 to rock in the clockwise direction to the position shown on FIG. 1 where an end portion 83*a* of latch lever 83 extends under ring 32 and a keeper 83*b*, at the opposite end of latch lever 83, is engaged with a flange 77*c* depending from the free end of bell crank arm 77*b* for limiting the rocking of bell crank 77 in the clockwise direction to the position shown on FIG. 1. With bell crank 77 in the position shown on FIG. 1 and determined by the engagement of latch lever 83 therewith, the distance from the axis of rotation of eccentric drive wheel 82 to the surface of grooved drive roller 70 is slightly greater than the minimum distance from the axis of rotation of drive wheel 82 to the periphery of the latter, and hence wheel 82 is spaced from, and not rotated by roller 70. In order to release latch lever 83, an abutment or pin 86 (FIGS. 1, 2 and 8) depends from ring 32 under pinch roller assembly 57 and is located to engage end portion 83*a* of latch lever 83 for rocking the latter in the counterclockwise direction, and thereby releasing its keeper 83*b* from bell crank 77, when ring 32 moves to its operative position as shown on FIG. 2.

When the keeper 83*b* of latch lever 83 is thus released from bell-crank 77, the action of spring 76 on pressing member 74 is transmitted through spring 80 to bell-crank 77 to further rock the latter in the clockwise direction and thereby bring wheel 82 against rotated roller 70. Thus, wheel 82 is turned by roller 70 and, in the course of such turning, presents peripheral portions to roller 70 which are at progressively increasing distances from the axis of rotation of wheel 82, whereby such axis of rotation defined by axle 81 is moved away from roller 70 and bell-crank 77 is rocked in the counter-clockwise direction to the position shown on FIG. 2. The described rocking of bell-crank 77 is transmitted through spring 80 to pressing member 74 to press flange 74*a* thereof against bearing roller 62 and thereby urge pinch rollers 60*a* and 60*b* against capstan 67.

In order to maintain pinch rollers 60*a* and 60*b* against capstan 67 to drive the tape during operation of apparatus 20 for recording or reproducing signals on tape T, assembly 73 still further comprises a second latch device 87 which includes a latch lever 88 pivoted at one end, as at 89, and urged by a spring 90 to the position shown on FIG. 2 where the free end of lever 88 blocks the return clockwise rocking of bell-crank 77. The latch device 87 further includes a release lever 91 pivoted intermediate its ends, as at 92, and having one of its ends engageable against a flange 88*a* on latch lever 88 with the other end of release lever 91 being connected, as by a pin and slot connection 93, with the armature 94 of a solenoid 95. The armature 94 is urged, as by a spring (not shown), to its extended position shown on FIG. 1 so that the release lever 91 depresses latch lever 88 to the position shown in full lines on FIG. 1 where it is free of bell-crank 77. However, when solenoid 95 is energized, armature 94 is retracted, as shown in full lines on FIG. 2, to permit spring 90 to elevate latch lever 88 and engage the free end of the latter with bell crank 77 after the latter has been rocked in response to turning of wheel 82, as described above.

The energizing of solenoid 95 is controlled by a normally open switch 96 which is closed to energize the solenoid when a switch actuator 97 is displaced toward the right from the position shown on FIG. 1. Such displacement of switch actuator 97 is effected by a lever 98 engaged therewith and pivotally mounted, as at 99, so as to extend under the path of ring 32 where a flange 100 on lever 98 is engageable by a pin 101 (FIG. 8) which may be a downward extension of pivot pin 59. Thus, when ring 32 moves to its operative position shown on FIG. 2, pin 101 engages flange 100 to rock lever 98 from the position of FIG. 1 to the position of FIG. 2, and switch actuator 97 is displaced to close switch 96 and thereby cause energization of solenoid 95.

In order to further guide the tape withdrawn from cassette 23, apparatus 20 has fixed guide pins 102 and 103 disposed in back of the location of cassette 23 when the latter is supported on the holder 22 and located adjacent the guide pins 28 and 29, respectively, of the cassette. Further, a fixed guide pin 104 is disposed adjacent drum 24 approximately on a line extending tangentially from guide pin 102 to the surface of drum 24, and a guide pin 105 is disposed adjacent drum 24 approximately on a line extending tangentially between drum 24 and capstan 67. As is particularly apparent on FIG. 3, guide pin 104 is substantially erect and is at a level that corresponds to that of the tape being withdrawn from cassette 23, and guide pin 105 is inclined from the vertical so as to be substantially perpendicular to the plane of rotation of ring 32 and is at a level substantially lower than that of guide pin 104 for engagement with the tape run extending from the surface of drum 24 to the tape engaging member 38 when ring 32 is in its operative position indicated on FIGS. 2 and 3.

A fixed magnetic recording and/or reproducing head is mounted on chassis 21 between capstan assembly 66 and guide pin 105 so as to be engaged by the tape when ring 32 is in its operative position, and such fixed magnetic head 106 may be employed for recording and/or reproducing audio and/or control signals on the tape, whereas the rotary head or heads 25 may be used for recording and/or reproducing video signals in skewed tracks extending obliquely across the tape.

In order to limit the turning of ring 32 to its operative position shown on FIG. 2 and the return movement of the ring to its inactive position shown on FIG. 1, tape loading device 31 has limit switches 107 and 108 (FIGS. 1 and 2) suitably mounted on the chassis adjacent ring 32 and having actuators 107′ and 108′, respectively which are selectively depressed by a switch operating member 109 secured to the ring. Actuators 107′ and 108′ are depressed by member 109 when ring 32 is in its operative position and in its inactive position, respectively. The switches 107 and 108 are normally closed and are selectively opened by the engagement of switch operating member 109 with their respective actuators 107′ and 108′. Device 31 further has a normally closed switch 110 also mounted on the chassis adjacent ring 32 and being spaced a relatively small angular distance, for example, approximately 30°, from switch 107 in the counterclockwise direction, as viewed on FIGS. 1 and 2, so that the actuator 110′ of switch 110 will be engaged by switch operating member 109 to open the normally closed switch 110 when ring 32 is turned by the described relatively small angular extent in counterclockwise direction from its operative position shown on FIG. 2.

Figures 15, 16, 17, 18:
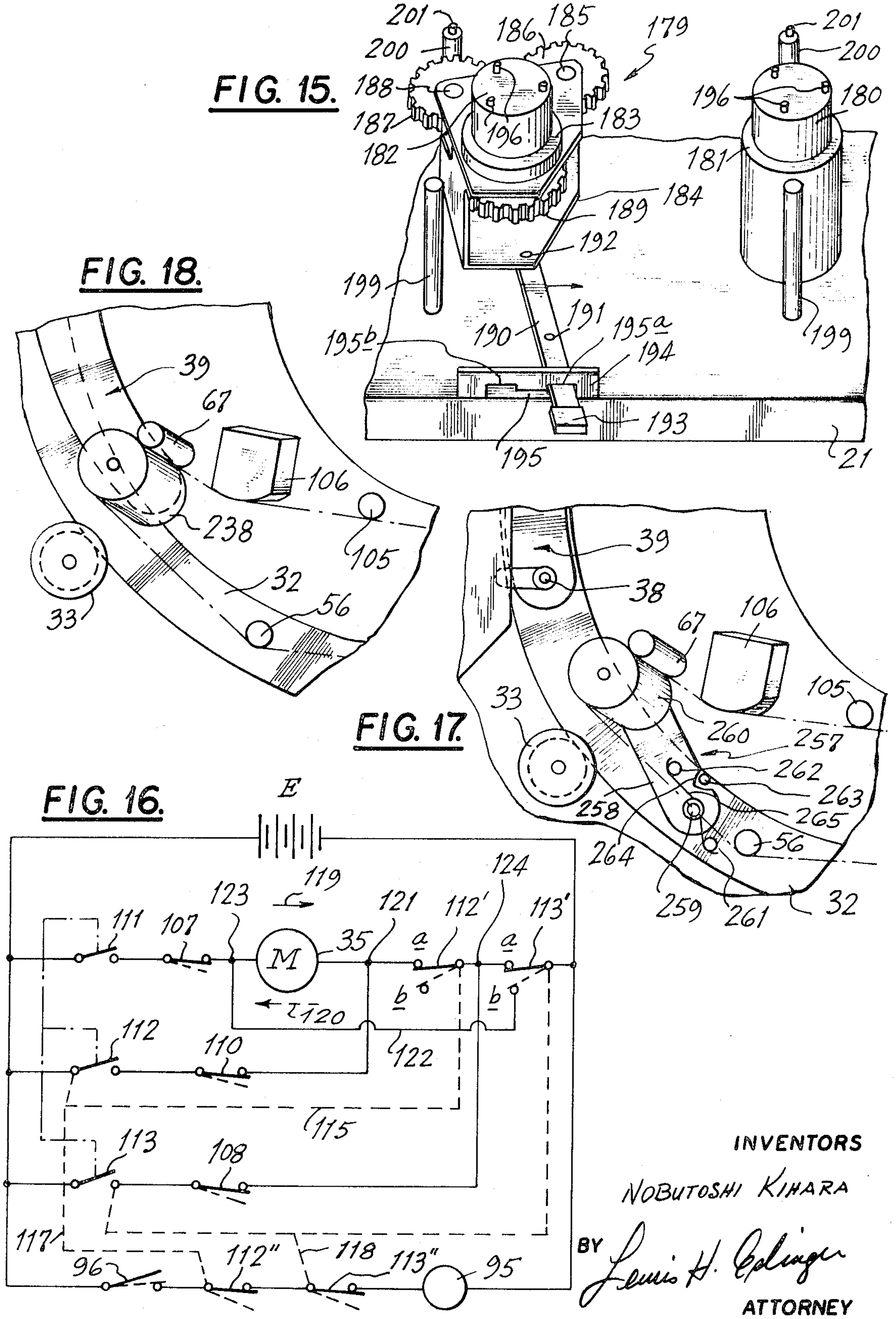
FIG. 15 is a fragmentary perspective view of an arrangment for driving the reels of a cassette in an apparatus according to this invention.
FIG. 16 is a schematic circuit diagram of a system for controlling the operation of the automatic tape loading device.
FIG. 17 is a fragmentary plan view similar to a portion of FIG. 2, but showing a modified pinch roller assembly.
FIG. 18 is a fragmentary view similar to FIG. 17, but showing still another pinch roller arrangement.

Referring now to FIG. 16, it will be seen that the controls for the tape loading device 31 further comprise a "play" switch 111, an "instantaneous stop" switch 112 and a "full stop" switch 113 which may be arranged adjacent to each other at a control panel of the recording and reproducing apparatus 20 and which are normally open, as shown. The switches 111, 112 and 113 are selectively actuable to their closed positions, for example, by manual operation of respective pushbuttons. Further, by means of conventional mechanical latching devices (not shown), each of the switches 111, 112 and 113 may be held in its closed position following actuation of its respective pushbutton, and the latching devices are mechanically interconnected in a conventional manner and as schematically indicated by the dot-dash line 114 on FIG. 14 so that, upon the actuation of any one of the switches 111, 112 and 113 to its closed position, any other one of the switches 111, 112 and 113 previously held or latched in its closed position is released and returned to its normally open position. The switches 112 and 113 are further shown to be ganged or mechanically interconnected, as indicated by the broken lines 115 and 116, with reversing switches 112′ and 113′, respectively. The switches 112′ and 113′ normally close their respective contacts *a* when the switches 112 and 113, respectively, are in their normal open positions. In response to closing of the switches 112 and 113, the ganged switches 112′ and 113′ are respectively actuated to engage their contacts *b*. The switches 112 and 113 are further ganged or mechanically connected with switches 112″ and 113″, respectively, which are normally closed and actuated to their open conditions in response to closing of the respective switches 112 and 113.

As shown, the reversible D.C. motor 35 for driving support ring 32 is connected to the opposite terminals of an electrical source E through switches 111 and 107, in series, and through contacts *a* of switches 112′ and 113′ in series, respectively. Thus, when "play" switch 111 is closed and switches 112′ and 113′ are in their normal positions indicated in full lines on FIG. 16, current flows through motor 35 in the direction of the arrow 119 until such time as limit switch 107 is opened, and such current flow through motor 35 effects rotation of its shaft in the direction of the arrow 119′ on FIGS. 1 and 2 for turning ring 32 in the clockwise direction. The switches 112 and 110 are shown to be connected in series between one terminal of source E and a junction 121 between motor 35 and contact *a* of switch 112′, and a conductor 122 extends from a junction 123 between motor 35 and limit switch 107 and is connected to contact *b* of both switches 112′ and 113′. The switches 113 and 108 are shown to be connected in series between a terminal of source E and a junction 124 between switch 112′ and contact *a* of switch 113′. Finally, FIG. 16 shows switches 112″ and 113″ to be connected in series with the previously described switch 96 in the circuit for energizing solenoid 95 of the latch device 87. When the switch 112 or the switch 113 is closed, the effect of such closure and of the consequent actuation of the reversing switch 112′ or 113′ is to cause current flow through motor 35 in the direction of the arrow 120 on FIG. 16, with the result that the motor is rotated in the direction of the arrow 120′ on FIGS. 1 and 2 for effecting turning of support ring 32 in the counterclockwise direction.

The above described tape loading device 31 operates as follows:

With ring 32 initially in its inactive position shown on FIG. 1, and a cassette 23 located on holder 22, tape engaging member 38 extends upwardly into opening 30 at the back of the cassette and engages in front of the tape run $T_1$ exposed at such opening. Upon closing of "play" switch 111, current is made to flow from source E through switches 111 and 107, through motor 35 in the direction of arrow 119 and then through contacts *a* of switches 112′ and 113′ back to the source. Thus, motor 35 is driven in the direction of the arrow 119′ on FIG. 1 to cause clockwise rotation of ring 32. During the initial portion of such clockwise rotation of ring 32 away from its inactive position, tape engaging member 38 is moved with the support ring, for example, to the position shown in broken lines at 38*a* on FIG. 1, and withdraws tape from the cassette to form a tape loop L. By reason of the coaction of cam plate 49 and the bent tab 51 acting as a cam follower, during the initial movement of ring 32 from its inactive position, arm assembly 39 is brought to a position approximately superposed on ring 32, as indicated in broken lines at 39*a* on FIG. 1. It will be seen that the tape loop L thus formed includes a side or run $L_1$ extending between tape engaging member 38 and guide pin 102 and facing toward drum 24 and a side or run $L_2$ extending between tape engaging member 38 and guide pin 103 and facing away from the guide drum. During the initial clockwise turning of support ring 32, the pinch roller assembly 57 and the adjacent guide pin 56 move into the loop L between the runs $L_1$ and $L_2$ thereof and, as clockwise rotation of ring 32 is continued, for example, to the operative position shown on FIG. 2, the tape loop is progressively lengthened, for example, as indicated at L′ on FIG. 2, and the other guide pins 55, 54, 53 and 52 move successively into such enlarged loop. The movement of pinch roller assembly 57 and the successive guide pins 56-52 into the progressively enlarging loop under the tape run extending between guide pins 102 and 104 is made possible by the described slanting plane of rotation of support ring 32 which results in the ring 32 and the elements carried thereby being at a relatively low level at the portion of the ring between drum 24 and cassette 23.

During the described clockwise rotation of ring 32 to the operative position shown on FIG. 2, the side $L'_1$ of the progressively enlarged loop L′ is wrapped about a substantial peripheral extent of drum 24 and the run of that side of the loop extending from drum 24 to tape engaging member 38 is brought adjacent capstan 67 and the fixed magnetic head 106, as shown on FIG. 2. Further, as the tape loop is progressively lengthened, the other side $L'_2$ thereof which extends from tape engaging member 38 to guide pin 103 is engaged by guide pins 52–56 on ring 32, and such guide pins 52–56 define a guide path for holding the side $L'_2$ of the lengthened loop away from the surface of drum 24.

Further, by reason of the slanting plane of rotation of ring 32, the tape engaging member 38 is moved to a relatively low level when it reaches the position shown on FIG. 2 so that the side $L'_1$ of the tape loop L′ which is wrapped around a substantial peripheral extent of the drum 24 forms a portion of a helix on the surface of the drum, that is, is inclined with respect to the plane of rotation of the rotary head or heads 25 so that such head or heads will scan skewed tracks on the tape.

When ring 32 reaches the position shown on FIG. 2, switch operating member 109 engages actuator 107' of switch 107 to open the latter and, as is apparent from FIG. 16, to interrupt the circuit for passing current through motor 35 in the direction of the arrow 119. Hence, turning of ring 32 is halted at its operative position.

As previously described, the movement of ring 32 to its operative position causes release of the latch lever 83 and also the closing of switch 96 so that pressing assembly 73 is operated to press pinch rollers **60*a* and 60*b* against capstan 67 with the tape therebetween for driving the tape in the direction of the arrow 125 on FIG. 2. So long as solenoid 95 remains energized by the closing of switch 96 and the maintenance of switches 112'' and 113'' in their normal closed positions, latch device 87 is effective to cause pressing assembly 73 to maintain pinch rollers 60*a* and 60*b* against capstan 67 so that the tape is continuously driven in the direction of the arrow 125 for unwinding from supply reel 26 and rewinding on the take-up reel 27**.

When it is desired to halt the recording or reproducing operation of apparatus 20 without unwrapping or unloading the tape from around drum 24, the "instantaneous stop" switch 112 is closed and, as a result of the interconnection of the mechanical latching mechanisms indicated at 114, the "play" switch 111 is released and returned to its open position. Closing of switch 112 causes displacement of switch 112' to the position shown in broken lines on FIG. 14 to close its contact *b*, by reason of the mechanical connection indicated at 115, and further causes opening of the switch 112'' by reason of the mechanical connection 117. The opening of switch 112'' deenergizes solenoid 95 to release latch device 87 to permit wheel 82 to again engage drive roller 70 so that wheel 82 is turned from the position of FIG. 2 to the position of FIG. 1. The consequent rocking of bell crank 77 permits pressing member 74 to move away from pinch roller assembly 57 and thereby free pinch rollers **60*a* and 60*b* from capstan 67. The closing of switch 112 completes an energizing circuit for the motor 35 from source E through switches 112 and 110, through motor 35 in the direction of the arrow 120, through conductor 122 to switch 112'** by way of its closed contact *b*, and then through switch 113' back to source E. Thus, simultaneously with the release of latch device 87 and the consequent removal from pinch roller assembly 57 of the force urging the pinch rollers against capstan 67, ring 32 is turned in the counterclockwise direction from the position shown on FIG. 2 and pin 86 moves away from the end portion **83*a* of latch lever 83 to permit the keeper 83*b* on such latch lever to again engage bell crank 77 for holding the latter in the position shown on FIG. 1. The counterclockwise turning of support ring 32 continues only until switch operating member 109 moves from the position shown on FIG. 2 to a position where it engages the acutator 110' of switch 110 for opening the latter. It will be apparent that opening of switch 110 interrupts the circuit for energizing motor 35 and hence ring 32 halts at a position that is angularly displaced from its operative position by approximately 30°. Such angular displacement of ring 32 is sufficient to remove the tape from engagement with capstan 67 so that driving of the tape is halted while the side $L'_1$ of the tape loop remains substantially in wrapped engagement with the periphery of drum 24**.

When it is desired to again initiate the recording or reproducing operation of apparatus 20, the "play" switch 111 is again closed and, through the mechanical interconnection indicated at 114, switch 112 is opened. The closing of switch 111 again causes driving of motor 35 in the direction indicated by the arrow 119' on FIGS. 1 and 2, whereby ring 32 is turned in the clockwise direction back to the position shown on FIG. 2 and the pinch roller assembly 57 is again acted upon by the pressing device 73 to engage the tape between the pinch rollers **60*a* and 60*b* and capstan 67 for driving the tape which is once again engaged with the fixed magnetic head 106**.

When it is desired to halt the recording or reproducing operation of apparatus 20 and to return the tape to cassette 23, the "full stop" switch 113 is closed and, through the mechanical interconnection 114, the previously closed switch 111 or switch 112 is opened. Closing of switch 113 effects displacement of reversing switch 113' through the mechanical interconnection 116 so that switch 113' is moved to the position shown in broken lines on FIG. 14 to close its contact *b*, and closing of switch 113 further causes opening of switch 113'' through the mechanical interconnection 118. Thus, if ring 32 is in its operative position shown on FIG. 2 when switch 113 is closed, the opening of switch 113'' again causes deenergizing of solenoid 95 to remove the force urging pinch roller assembly 57 against capstan 67, as described above in connection with the closing of switch 112. Further, closing of switch 113 completes a circuit for energizing motor 35 from source E through switches 113 and 108 to junction 124, through switch 112' and motor 35 in the direction of arrow 120, and then through conductor 122 and closed contact *b* of switch 113' back to the source E. Thus, motor 35 is rotated in the direction 120' on FIG. 2 to turn ring 32 in the counterclockwise direction. During such counterclockwise turning of ring 32, take-up reel 27 is conventionally driven in the direction for rewinding the tape thereon so that, as ring 32 turns from the position shown on FIG. 2 to the inactive position shown on FIG. 1, the tape loop L is progressively reduced in size until such loop completely disappears and the tape run $T_1$ again extends between guide pins 28 and 29 of cassette 23. When ring 32 returns to its inactive position of FIG. 1, switch operating member 109 engages actuator 108' of switch 108 to open the switch 108 and thereby interrupt the circuit for energizing motor 35. Thus, the turning of ring 32 is halted with all of the parts of the tape loading device 31 in their original or inactive positions shown on FIG. 1.

Figures 9, 10, 10A:
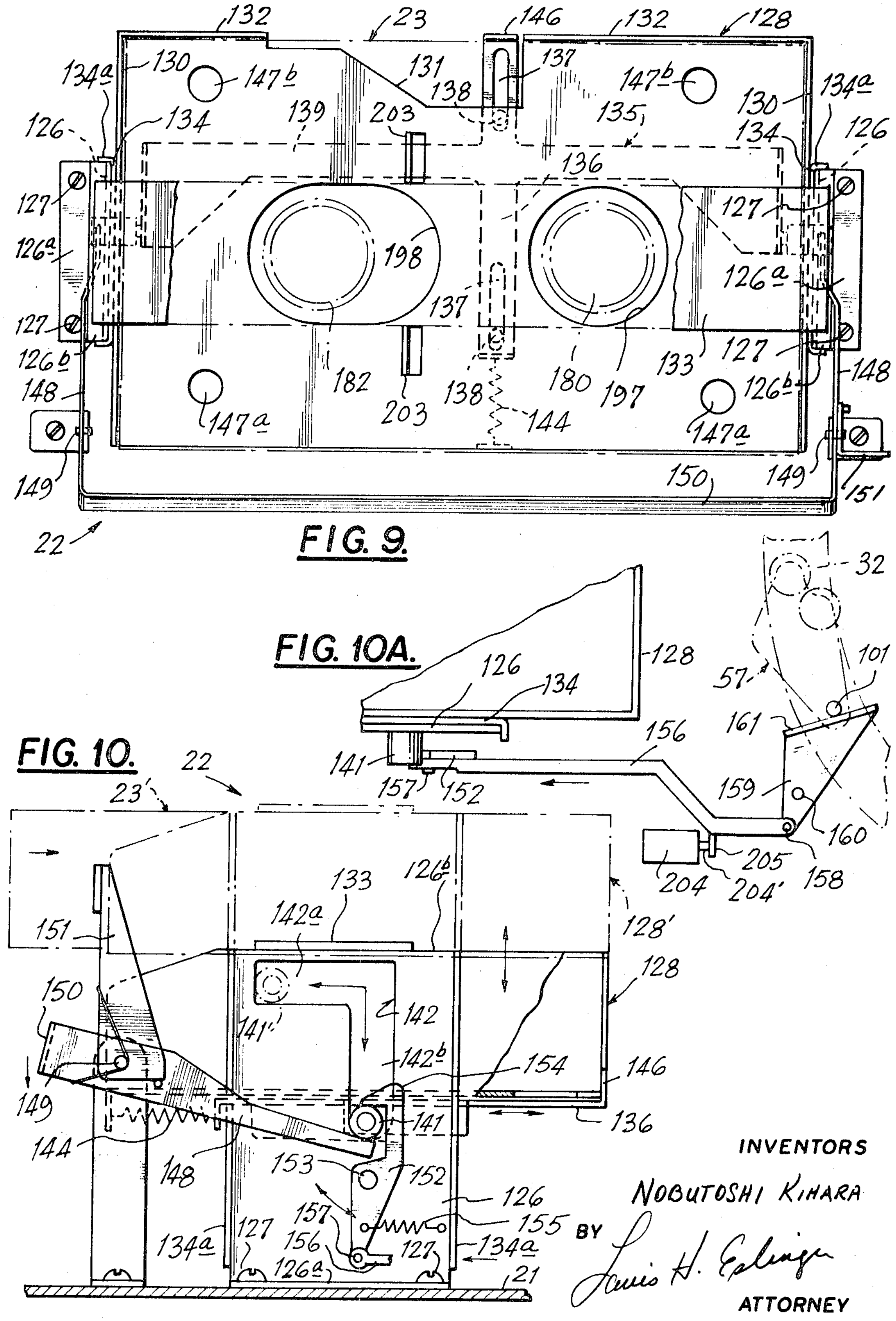
FIG. 9 is a top plan view of a cassette holder included in the magnetic recording and reproducing apparatus according to this invention.
FIG. 10 is a side elevational view of the cassette holder.
FIG. 10A is a fragmentary plan view of a release device for the cassette holder.

Referring now to FIGS. 9 and 10, it will be seen that the cassette holder 22 which was merely schematically represented on FIG. 3 prefereably comprises a pair of laterally spaced apart, upstanding support plates 126 having outwardly directed flanges **126*a* at their lower ends which are secured, as by screws 127, on chassis 21. The upper ends of support plates 126 also have outwardly directed flanges 126*b* which, as hereinafter described, act as stops for limiting the downward travel between support plates 126 of a carriage 128. As shown on FIG. 11, carriage 128 includes a bottom wall or plate 129 having upstanding flanges 130 extending along its opposite side edges, a cutout 131 in the back portion of bottom wall 129** to permit thetape engaging member 38 of tape loading device 31 to extend upwardly through such cutout 121 and into the opening 30 of a cassette 23 when the latter is received in carriage 128, and upwardly directed flanges 132 extending along portions of the back edge of wall 129 at opposite sides of cutout 131 to limit the rearward movement of a cassette on bottom wall 129. Carriage 128 further includes a cross piece 133 secured at its opposite ends to the top edges of flanges 130 and being spaced upwardly by the latter from bottom wall 129 so that a cassette 23 is slidable therebetween when introduced into carriage 128 at the front of the latter. Slides 134 are welded or otherwise secured to the outer sides of flanges 130 and extend downwardly therefrom. The slides 134 have parallel, outwardly directed vertical flanges 134*a* along their opposite side edges to slidably engage the side edges of support plates 126 when carriage 128 is disposed between such support plates. Thus, carriage 128 is guided for vertical movement between a lowered operative position shown in full lines on FIG. 10 and at which projecting end portions of cross piece 133 bear on flanges 126*b* of support plates 126 to prevent further downward movement of the carriage, and a raised, inoperative or cassette-receiving position indicated in broken lines at 128' on FIG. 10. An actuating member 135 (FIG. 12) is disposed under bottom wall 129 of carriage 128 and includes a slide portion 136 extending fore-and-aft and having slots 137 therein which slidably receive pins 138 depending from bottom wall 129 to guide actuating member 135 for movement forwardly and rearwardly with respect to carriage 128. Actuating member 135 further includes a lateral portion 139 having depending flanges 140 at its opposite ends carrying outwardly directed pins 141. Pins 141 project outwardly through, and are slidably in horizontal slots 134*b* formed in slides 134. Pins 141 further project outwardly through and are slidable along right-angled slots 142 (FIG. 10) formed in support plates 126 and each having a horizontal upper slot portion 142*a* and a vertical slot portion 142*b* extending downwardly from the back end of the respective slot portion 142*a*.

A downwardly bent tab 143 is provided at the forward end of slide portion 136 and a spring 144 is connected between tab 143 and a downwardly bent tab 145 at the forward edge of bottom wall 129 so that actuating member 135 is urged forwardly relative to carriage 128. Thus, when carriage 128 is in its elevated position indicated at 128' on FIG. 10, spring 144 causes pins 141 to be urged forwardly to the forward ends of slot portions 142*a*, whereby carriage 128 is retained in its raised position for slidably receiving a cassette 23 at the front of the carriage. The back end of slide portion 136 is formed with an upstanding lug 146 which projects upwardly into cutout 131 and, when carriage 128 is in its raised position, is urged by spring 144 to bear against the edge portion 131*a* of cutout 131, as indicated at 146' on FIG. 11.

When a cassette 123 is slidably insered into the carriage at its raised position 128', rearward sliding of the cassette 23 over the bottom wall 129 of the carriage brings the back wall of the cassette against lug 146 and thereby propels the latter into alignment with the flanges 132 extending along the back edge of wall 129, for example, to the position indicated on FIG. 9. Such rearward displacement of lug 146, and hence of actuating member 135, moves the pins 141 rearwardly along the horizontal portions 142*a* of slots 142, whereupon pins 141 arrive at the upper ends of vertical portions 142*b* of the slots and the carriage 128 is free to drop, under the influence of gravity, from its raised position 128' to its lowered or operative position indicated in full lines on FIG. 10. With carriage 128 in such lowered operative position, tape engaging member 38 extends upwardly in cutout 131 and also into the opening 30 of the cassette carried by carriage 128, as previously described herein. When carriage 128 is in its lowered operative position, a cassette 23 carried thereby is engaged by locating pins, as hereinafter described, which extend upwardly through apertures 147 in bottom wall 129 of the carriage (FIG. 9), so that the cassette 23 cannot be removed from the carriage when the latter is in its lowered or operative position.

In order to raise carriage 128 from its lowered operative position to its raised position 128', cassette holder 22 further includes levers 148 extending rearwardly at the outer sides of support plates 126 and having their rear end portions engaging under pins 141. Levers 148 are pivotally supported, as at 149 (FIGS. 9 and 10) and are rigidly connected to each other, at their forward ends, by a laterally extending bail or cross piece 150. An acutating arm 151 extends upwardly from one of the levers 148 and is manually operable to cause rocking of levers 148 as a unit. Thus, with carriage 128 in its lowered operative position shown in full lines on FIG. 10, the upper end of arm 151 can be pulled forwardly to rock levers 148 in the counterclockwise direction and thereby lift pins 141 to the level of horizontal slot portions 142*a*, whereupon spring 144 will propel actuating member 135 forwardly for moving pins 141 to the positions indicated at 141' on FIG. 10, and further for moving lug 146 forwardly in cutout 131. Thus, the carriage will again be locked or latched in its raised position and a cassette 23 in the carriage will be propelled forwardly or partially ejected from the carriage, as indicated at 23' on FIG. 10.

In accordance with the present invention, movement of the carriage from its lowered operative position to its raised position indicated at 128' on FIG. 10 is permitted only when support ring 32 of the previously described tape loading device 31 is at its inactive position, that is, only when the tape is unwrapped from drum 24 and fully contained within the cassette 23. In order to achieve the foregoing, cassette holder 22 is further shown to include a latch lever 152 (FIG. 10) which is pivoted, as at 153, on one of the support plates 126 and which has a hook portion 154 at its upper end portion engageable with the adjacent pin 141 when the latter is at the bottom of vertical slot portion 142*b*, that is, when carriage 128 is at its lowered operative position. A spring 155 acts on latch lever 152 to urge the latter in the counterclockwise direction, as viewed on FIG. 10, and thereby to maintain the hook portion 154 of the latch lever in engagement with the adjacnet pin 141.

In order to release latch lever 152 from the adjacent pin 141 and thereby permit the movement of the carriage to its raised inoperative position 128', a link 156 is pivotally connected, as at 157, to the lower end of latch lever 152 (FIG. 10) and extends rearwardly therefrom for pivotal connection, as at 158, to a latch releasing member 159 (FIG. 10A). The latch releasing member 159 is pivotally mounted on the chassis, as at 160, and is formed with an upstanding flange 161 extending under the path of travel of support ring 32 which is shown in broken lines on FIG. 10A. The latch releasing member 159 is positioned so that, when ring 32 is turned in the counterclockwise direction back to its inactive position shown on FIG. 1, the actuating pin 101 which depends from ring 32 and is a downward extension of the pivot for the pinch roller assembly 57 will bear against flange 161 and thereby rock member 159 in the clockwise direction to the position shown on FIG. 10A. Such rocking of latch releasing member 159 causes forward displacement of link 156 and thereby pivots latch lever 152 in the direction for releasing its hook portion 154 from the adjacent pin 141. Thus, with support ring 32 of the tape loading device in its inactive position, carriage 128 is free to be raised by manual operation of the arm 151.

Figures 11, 12, 13, 14:
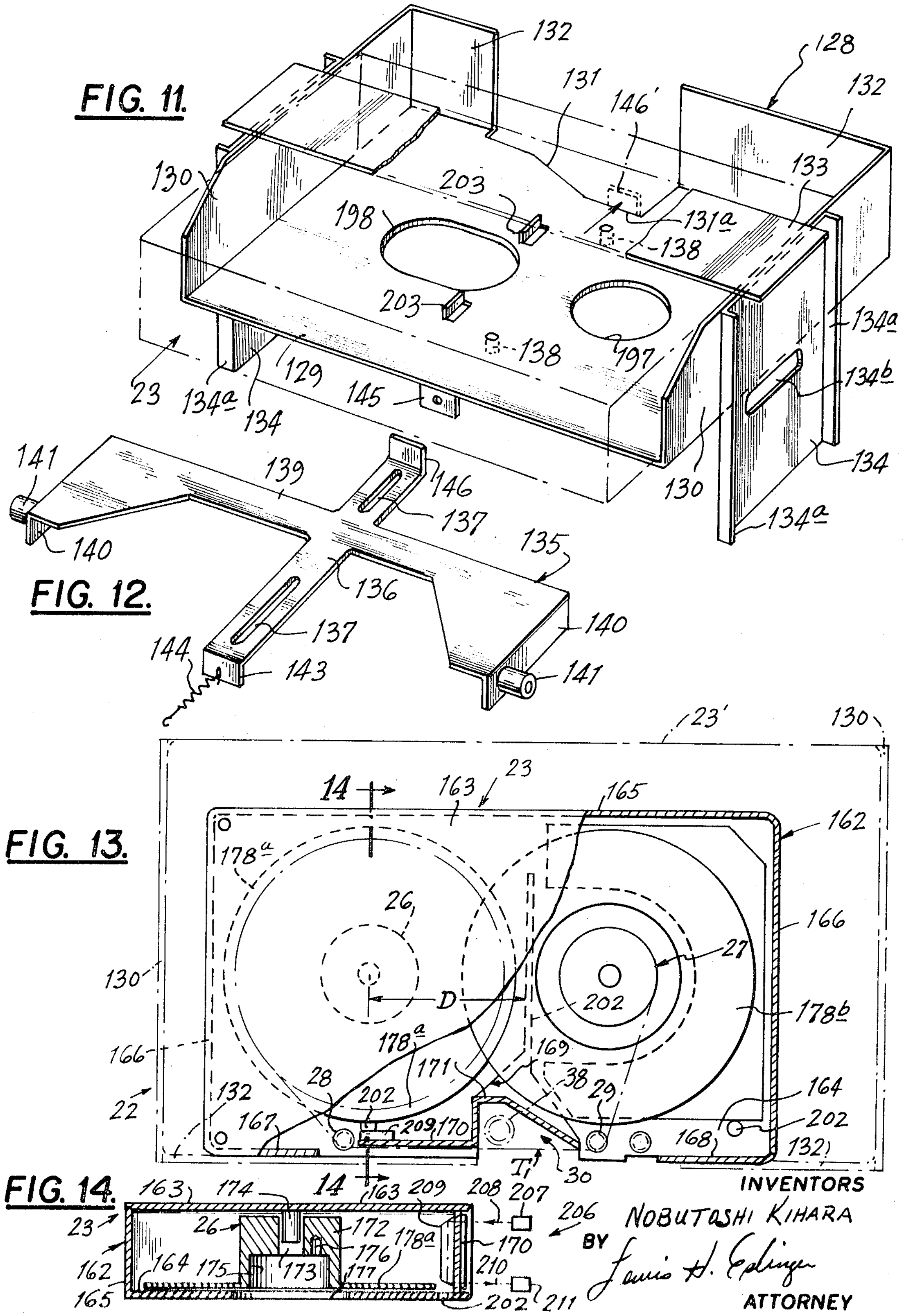
FIGS. 11 and 12 are perspective views of elements included in the cassette holder of FIGS. 9 and 10.
FIG. 13 is a top plan view, partly broken away and in section, of a cassette for use in connection with the magnetic recording and reproducing apparatus.
FIG. 14 is a sectional view taken on the line 14-14 of FIG. 13.

Referring now to FIGS. 13 and 14, it will be seen that each cassette 23 for use in the apparatus 20 according to this invention preferably includes a relatively flat, generally rectangular housing 162 which may be formed of a suitable rigid plastic and includes a top wall 163 and a bottom wall 164 held in parallel spaced relation by a continuous front wall 165 and side walls 166. At the back of housing 162, top and bottom walls 163 and 164 are connected by wall sections 167 and 168 which extend inwardly from the opposite side walls 166 and respectively terminate adjacent the previously mentioned guide pins 28 and 29 which extend between the top and bottom walls. The back edge of top wall 163 extends straight across between wall sections 167 and 168, while bottom wall 164 has a cutout 169 opening at its back edge between guide pins 28 and 29 to define the previously generally referred to opening 30 into which the tape engaging member 38 of tape loading device 31 can project upwardly. Preferably, a partition 170 extends laterally between guide pins 28 and 29 at the back of the housing and has an angled portion 171 which defines the forward margin of opening 30 and which spans the cutout 169 in bottom wall 164. It will be seen that partition 170 is offset forwardly with respect to wall sections 167 and 168 so that the run $T_1$ of the tape extending between guide pins 28 and 29 will pass rearwardly of partition 170.

Each of the supply and take-up reels 26 and 27 has a cylindrical core 172 formed with a central bore 173 opening at the top of the core and loosely receiving a pin 174 that depends from top wall 163 for loosely locating the respective reel within housing 162. Further, each core 172 has a downwardly opening socket 175 with recesses 176 bored in the roof thereof, and bottom wall 164 of the cassette housing has a circular opening 177 which is concentric with the socket 175 of each reel and of greater diameter than such socket to permit a driving hub to extend through opening 177 and into socket 175, as hereinafter described. The supply reel 26 may have a radial flange **178*a* extending from the bottom of its core 172, while the take-up reel 27 has a similar flange 178*b* extending from the top of its core, with the flanges 178*a* and 178*b* being in laterally overlapping relation, as shown on FIG. 13, so that a relatively large supply of tape may be contained within a cassette 23** of minimized lateral size.

The cassette holder 22, indicated in broken lines on FIG. 13, may be dimensioned to receive a relatively large cassette, the outline of which is also indicated in broken lines at 23' on FIG. 13. Such relatively large cassette 23' may contain sufficient tape of ¾ inch width for a playing time of 60 minutes, and preferably has the standardized lateral, front-to-back and height dimensions of 221 mm., 140 mm. and 32 mm., respectively. However, it is intended that the apparatus 20 according to this invention should be capable of operation with either the standard size, relatively large cassette indicated at 23' in broken lines on FIG. 13, or with a relatively small cassette, for example, as shown in full lines on FIG. 13, and which may contain only sufficient tape for one-half hour of playing time.

In the case of cassettes smaller than those of the standard size, the distance between the axes of the supply and take-up reels is reduced. Therefore, the recording and reproducing apparatus 20 according to this invention is preferably provided with a reel drive assembly 179 (FIG. 15) which is adapted to accommodate either the standard, relatively large cassettes or smaller cassettes with a reduced distance between the axes of the reels therein. As shown, reel drive assembly 179 includes a cylindrical hub 180 having a shoulder 181 at its lower end and being mounted above chassis 21 for rotation about a fixed vertical axis, and a cylindrical hub 182 having a shoulder 183 at its lower end and being mounted above chassis 21 for rotation about a vertical axis that is movable toward and away from the axis of hub 180, for example, between the position shown on FIG. 15 and a position relatively closer to hub 180. In the embodiment shown, the mounting for hub 182 includes a bracket 184 that is swingable about a drive shaft 185 and on which the hub 182 is rotatably supported with its axis spaced radially from shaft 185. In order to transmit the rotation of shaft 185 to hub 182, a drive gear 186 is fixed on shaft 185 and meshes with an idler gear 187 rotatable on a shaft 188 carried by bracket 184, and the idler gear 187 meshes with a driven gear 189 secured to a shaft (not shown) which is fixed with respect to hub 182. A lever 190 is pivoted intermediate its ends on chassis 21, as at 191, and has its back end pivotally connected at 192 to bracket 184. The forward end of lever 190 forms a handle 193 and extends through a positioning member 194 which defines a slot 195 having upwardly enlarged end portions **195*a* and 195*b*. When lever 190 is engaged in either of the enlarged slot portions 195 *a* and 195*b* the lever rests against the upper surface of the respective enlarged slot portion and thus is blocked against inadvertent shifting. However, when the handle 193 is pressed downwardly to flex lever 190, the latter can pass from one to the other of the enlarged slot portions 195*a* and 195*b* through the intervening narrow portion of slot 195**.

With lever 190 in the position shown on FIG. 15, hub 182 is relatively widely spaced from hub 180 so as to correspond with the spacing between the reel centers of the relatively large standard cassettes. When lever 190 is shifted to engage in slot portion **195*b*, bracket 184 is rocked toward hub 180, and the distance between hubs 180 and 182** is reduced to correspond with the spacing between the reel centers of the relatively small cassettes.

Of course, the hubs 180 and 182 are dimensioned to fit into the sockets 175 opening at the bottom of cores 172 of supply and take-up reels 26 and 27, respectively, and pins 196 project from the top surfaces of hubs 180 and 182 to fit into the recesses or bores 176 in the roofs of sockets 175 and thereby provide a rotational coupling between each hub and the respective reel.

The hubs 180 and 182 are vertically positioned so that, when carriage 128 of holder 22 is lowered to its operative position shown in full lines on FIG. 10, hubs 180 and 182 will project upwardly through openings 197 and 198 (FIGS. 9 and 11) in bottom wall 129 of the carriage and through respective openings 177 (FIG. 14) in the bottom wall 164 of the cassette to be received in the sockets 175 of reels 26 and 27 with the bottom surfaces of the reels seating on shoulders 181 and 183 for accurate vertical positioning thereby. Further, forward positioning posts 199 (FIG. 15) extend upwardly from chassis 21 in front of hubs 180 and 182 and are vertically dimensioned so that, when carriage 128 is lowered to its operative position, the upper ends of posts 199 extend into openings 147*a* in the forward portion of bottom wall 129 and the bottom wall 164 of the cassette seats on the upper ends of posts 199. Rear positioning posts 200 similarly extend upwardly from chassis 21 and have reduced diameter pins 201 projecting from their upper ends. Posts 200 are vertically dimensioned so that, when carriage 128 is lowered to its operative position, the upper ends of posts 200 extend into openings 147*b* in the back portion of bottom wall 129 and seat against bottom wall 164 of the cassette with pins 201 being received in corresponding openings 202 (FIGS. 13 and 14) provided in bottom wall 164. Thus, when carriage 128 of holder 22 is in its operative position, a cassette 23 carried by such carriage is accurately located in the vertical direction and also accurately located laterally and in the forward and rearward direction.

Of course, the foregoing assumes that the cassette 23 will be properly located with respect to carriage 128 prior to the downward movement of the latter to its operative position. Since the apparatus 20 according to this invention is intended to accommodate cassettes of different overall dimensions, the lateral positioning of each cassette in carriage 128 cannot rely on engagement of side walls 166 of the cassette with side flanges 130 of the carriage. Accordingly, each cassette has a slot 202 (FIG. 13) in its bottom wall 164 opening at its back end into cutout 169 and being spaced from the center of supply reel 26 by a distance D that is constant for all cassettes irrespective of their size, and locating tabs 203 are struck from bottom wall 129 of carriage 128 to be slidably received in slot 202 of a cassette as the latter is slidably introduced into the carriage. In order to facilitate the entry of tabs 203 into slot 202, side edges of cutout 169 are made to converge to the back end of slot 202 (FIG. 13), whereby to guide the tabs into the slot. Thus, each cassette, irrespective of its size, is located in carriage 128 for engagement of hub 180 in the socket of its supply reel 26 when carriage 128 is lowered, and, prior to such downward movement of the carriage to its operative position, lever 190 is manually shifted to the position corresponding to the size of the cassette being employed so that hub 182 will engage in the socket of the take-up reel 27. For all cassettes, irrespective of their size, the reel centers are located a standard distance from the back wall sections 167,168 so that the engagement of the latter with flanges 132 of the carriage will serve to locate the reels in the fore and aft direction for engagement by hubs 180 and 182.

Although not shown, the apparatus 20 is, of course, provided with conventional motor-powered drives for selectively rotation shaft 185, and hence hub 182 coupled to the take-up reel 27 during the recording and reproducing operation of the apparatus and during the fast-forwarding of the tape, and for selectively rotating hub 180, and hence the supply reel 26 during rewinding of the tape from take-up reel 27 onto reel 26. Preferably, the controls (not shown) for the fast forward and rewinding operations are arranged so that the high speed fast forward or rewinding operations can occur only with ring 32 of the tape loading device 31 in its inactive position (FIG. 1) to remove the tape from drum 24. Thus, the relatively high frictional resistance to movement of the tape wrapped on drum 24 is not present to retard the fast forward or rewinding operations. As shown by way of example on FIG. 10A, a normally open switch 204 may be interposed in the fast-forward and rewinding control circuits of the apparatus to permit the fast-forward or rewinding operations to occur only when the switch 204 is closed upon engagement of its actuator 204' by an abutment 205 on link 156 in response to the angular displacement of member 159 resulting from movement of ring 32 to its inactive position.

Further, it is preferred that the tape T in each cassette 23 have transparent leaders at each of its ends and that an electro-optical arrangement be provided to detect such transparent leaders, that is, to detect the full unwinding of the tape from supply reel 26 onto take-up reel 27 and the full rewinding of the tape back onto supply reel 26. Such electro-optical detecting arrangement 206 (FIG. 14) may generally comprise a light source 207 directing a beam of light 208 forwardly toward the partition 170 of the cassette 23 when the latter is supported by carriage 128 at the lowered operative position of the latter. At least that portion of partition 170 which is in the path of light beam 208 is transparent and a double-reflecting prism-element 209 is disposed against the front surface of the transparent portion of partition 170. Thus, when one or the other of the transparent tape leaders passes in back of partition 170, light beam 208 passes through the leader and is reflected downwardly and then rearwardly by prism-element 209 to emerge through the transparent partition 170, as indicated at 210, and impinge on a suitably located photocell 211. Of course, since the magnetic tape itself is opaque, the presence of such tape in back of partition 170 will normally prevent the impingement of the relfected light beam 210 on photocell 211.

During the normal recording or reproducing mode of operation of the apparatus, the energizing of photocell 211, as described, may be relied upon to initiate the automatic unloading of the tape from drum 24 and, thereafter, the high-speed rewinding of the tape back onto supply reel 26. At the completion of the high-speed rewinding operation, the energizing of photocell 211 may cause a halt of such operation.

Referring now to FIG. 17, it will be seen that the pinch roller assembly 57 of the tape loading device 31 described above and the associated pressing device 73 may be replaced by a pinch roller assembly 257 that simply includes an arm 258 pivoted at 259 on ring 32 and carrying a rotatable pinch roller 260 which is pressed against the rotated capstan 67, when ring 32 is in its operative position, by means of a torsion spring 265 which extends around pivot 259 and has its ends engaged with pins 261 and 262 on ring 32 and arm 258, respectively. The inward swinging of arm 258 by spring 265 is limited by a stop pin 263 on ring 32 engaging in a notch 264 of arm 258 so that, as ring 32 nears its operative position shown on FIG. 17, pinch roller 260 will roll into tight engagement with capstan 67 to cause driving of the tape therebetween.

FIG. 18 shows another modification of the described tape loading device in which the tape engaging member 238 carried by arm 39 is pressed against the capstan 67 when ring 32 is in its operative position, thereby to function as a pinch roller for causing the drive of the tape between capstan 67 and member 238 which is in the form of a freely rotatable roller. Thus, with the arrangement of FIG. 18, a pinch roller assembly separate from tape engaging member 238 can be dispensed with.

In all of the described embodiments of the invention, the tape engaging member 38 or 238 moves from a relatively high position, to engage the tape in the cassette, to a relatively low position in response to turning of ring 32 to its operative position, whereby the tape is wrapped helically on the drum for skewed scanning by the rotary head or heads. Further, the eccentric relation of ring 32 to drum 24 ensures that, with tape engaging member 38 or 238 in its operative position shown on FIGS. 2, 17 and 18, a substantial run of the tape will extend therefrom to the surface of drum 24 for accommodating the fixed head 106 and also the pinch roller assembly 57 or 257 without requiring an unduly large diameter for the ring 32. Thus, the tape loading device 31 can be used in relatively compact video tape recorders.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A magnetic recording and/or reproducing apparatus comprising take-up and supply reels carrying a magnetic tape and between which said tape extends, a cylindrical tape guide drum, at least one rotary magnetic head moved in a path substantially coinciding with the periphery of said drum, a plurality of guides mounted about said periphery of the drum but spaced therefrom, means for moving said guides in an inclined arcuate path which extends about said periphery of the drum and which is relatively low at a portion of said arcuate path disposed between said guide drum and said reels, tape engaging means adapted to engage said magentic tape between said reels when said apparatus is in an inactive condition, and means for moving said tape engaging means in accompaniment with said guides to withdraw a loop of tape from said reels and engage one side of the tape loop with said drum over a predetermined peripheral extent of the latter for scanning by said rotary head while said guides, in moving along said low portion of the arcuate path, pass under said one side of the tape loop so as to enter the latter and hold the other side of the tape loop away from said guide drum.

2. A magnetic recording and/or reproducing apparatus as in claim 1, in which said reels are remote from said arcuate path in which the guides are moved, and said tape engaging means is movable into and out of said arcuate path, and further comprising means for displacing said tape engaging means out of said arcuate path in said inactive condition of the apparatus for said engagement with said tape between said reels, and for moving said tape engaging means into said arcuate path in the course of the movement of said tape engaging means in accompaniment with said guides.

3. A magnetic recording and/or reproducing apparatus as in claim 2, in which a rotatable support member extends around said guide drum, and said guides and said tape engaging means are mounted on said support member.

4. A magnetic recording and/or reproducing apparatus as in claim 3, in which said support member is in the form of a ring rotatable about its center which is eccentrically located with respect to the axis of said guide drum in the direction toward said reels so as to provide a relatively large clearance between said ring and said drum at the side of the latter facing toward said reels, and further comprising a rotated capstan spaced from said guide drum and located within said clearance to be engageable by said tape in response to the movement of said tape engaging means and guides for engaging the tape with said drum, pinch roller means carried by said support member to be moved adjacent said capstan upon completion of said movement of said engaging means and guides, and means operative upon said completion of said movement to press said pinch roller means against said capstan with said tape therebetween for driving said tape.

5. A magnetic recording and/or reproducing apparatus as in claim 4, further comprising at least one fixed magnetic head spaced from said guide drum within said clearance and being engaged by the tape in response to the movement of said engaging means in accompaniment with said guides.

6. A magnetic recording and/or reproducing apparatus as in claim 3, in which said support member is in the form of a ring.

7. A magnetic recording and/or reproducing apparatus as in claim 6, in which said ring is rotatable about its center which is eccentrically located with respect to the axis of said guide drum in the direction toward said reels.

8. A magnetic recording and/or reproducing apparatus as in claim 3, in which said reels are mounted at a level above the plane of rotation of said head, said support member is rotatable in a plane that is slanted with respect to said plane of rotation of the head, and, at the conclusion of the movement of said tape engaging means in accompaniment with said guides, said tape engaging means is located at a relatively low portion of said support member for causing the tape to extend helically on said peripheral extent of the drum.

9. A magnetic recording and/or reproducing apparatus as in claim 8, in which said plane of rotation of the head is slanted with respect to the planes of rotation of said reels so as to substantially bisect and angle included between the plane of rotation of said support member and the planes of rotation of said reels.

10. A magnetic recording and/or reproducing apparatus as in claim 8, in which said tape engaging means is movable relative to said support member both in directions generally toward and away from the center of rotation of said support member and in directions generally perpendicular to said plane of rotation of the support member, and, in said inactive condition of the apparatus, said tape engaging means is displaced upwardly away from said plane of rotation of the support member and away from the center of rotation of the latter for engagement with the tape between said reels mounted at said level above the plane of rotation of the head.

11. A magnetic recording and/or reproducing apparatus according to claim 10, in which said tape engaging means includes a guide pin, arm means supporting said pin at one end thereof, and means mounting the other end of said arm means on said support member for movement of said pin in said directions generally toward and away from the center of rotation of the support member and in said directions generally perpendicular to said plane of rotation of the support member.

12. A magnetic recording and/or reproducing apparatus as in claim 10, in which said means for displacing said tape engaging means out of said arcuate path and for moving said tape engaging means into said arcuate path includes cam means extending along at least part of the periphery of said support member and cam follower means connected with said tape engaging means and engageable with said cam means.

13. A magnetic recording and/or reproducing apparatus as in claim 12, in which spring means are connected with said tape engaging means to urge the latter into said arcuate path.

14. A magnetic recording and/or reproducing apparatus according to claim 10, further comprising a cassette housing said take-up and supply reels and having an opening at which the tape between the reels is exposed, and said tape engaging means includes a guide pin supported at one end by movable arm means attached to said support member and positioned, in said inactive condition of the apparatus, to extend into said opening of the cassette for engaging the tape there exposed.

15. A magnetic recording and/or reproducing apparatus as in claim 14, in which said guide pin extends upwardly from said arm means, and further comprising a cassette holder including a carriage for receiving the cassette in a raised position and being movable downwardly to a lowered operating position at which said guide pin projects upwardly, in the inactive condition of the apparatus, into said opening of the cassette carried by said carriage.

16. A magnetic recording and/or reproducing apparatus as in claim 15, further comprising selectively driven hubs mounted below said carriage of the cassette holder and projecting upwardly through the carriage for respectively engaging said take-up and supply reels when said carriage is in said lowered operating position, means for varying the spacing between said hubs to adapt the apparatus for use with respective sizes of cassettes, and locating means on said carriage and each cassette for positioning the latter properly to have its reels engaged by said hubs.

17. A magnetic recording and/or reproducing apparatus as in claim 16, in which said carriage includes a substantially horizontal support plate onto which said cassette is slidable in said raised position of the holder, and said locating means includes upstanding projections on said support plate and a slot in the bottom of each cassette to receive said projections during the sliding of the cassette onto said support plate.

18. A magnetic recording and/or reproducing apparatus comprising spaced take-up and supply reels carrying a magnetic tape and between which said tape extends, a cylindrical tape guide drum spaced from said reels, at least one rotary magnetic head moved in a path substantially coinciding with the periphery of said drum, a support member extending around said drum and being rotatable in a plane that is inclined downwardly toward said reels, a plurality of guides extending upwardly from said support member and being spaced from the periphery of said drum for movement in an arcuate path about the latter, means for turning said support member between first and second angularly spaced positions, a tape engaging member mounted on said support member for turning with the latter and being movable into and out of said arcuate path, and means for displacing said tape engaging member out of said arcuate path to engage said tape between the reels when said support member is in said first position and for moving said tape engaging member into said arcuate path upon turning of said support member to said second position so that said turning of the support member causes said tape engaging member to form a loop in said tape between the reels which loop has one side wrapped about a predetermined peripheral portion of said drum for scanning by said head, while said guides move between said drum and reels under said one side of the tape loop to engage the other side of said tape loop and hold said other side away from said drum.

19. A magnetic recording and/or reproducing apparatus as in claim 18, in which said support member is in the form of a ring extending around said drum and being supported by rotatable grooved rollers engaging the periphery of said ring, and said means for turning the support member includes a driven roller frictionally engaging said periphery of the ring.

20. A magnetic recording and/or reproducing apparatus as in claim 18, in which said support member is in the form of a ring rotatable about its center which is displaced from the axis of said drum in the direction generally toward said reels, and in which said tape engaging means is mounted on said ring so as to be relatively widely spaced from said drum in both said first and second positions of said support member.

21. A magnetic recording and/or reproducing apparatus as in claim 20, further comprising fixed magnetic head means disposed between said ring and said guide drum and being located to engage said tape between said tape engaging means and the portion of the tape wrapped about said drum when said support member is moved to said second position.

22. A magnetic recording and/or reproducing apparatus as in claim 20, further comprising a rotated capstan disposed between said drum and said ring and located to be engageable by said tape between said tape engaging means and the portion of the tape wrapped about said drum when said support member is moved to said second position, pinch roller means carried by said ring to be moved adjacent said capstan with the tape therebetween when said support member is moved to said second position, and means for pressing said pinch roller means against said capstan when said support member attains said second position.

23. A magnetic recording and/or reproducing apparatus as in claim 22, in which said pinch roller means is mounted on said ring for movement toward and away from said capstan when adjacent the latter, and said means for pressing the pinch roller means against the capstan includes a presser member mounted adjacent said ring and being movable between an active position where said presser member bears against said pinch roller means to press the latter against said capstan and an inactive position spaced from said pinch roller means and to which said presser member is yieldably urged, actuating means movable into engagement with said capstan to be driven by the latter for moving said presser member to said active position of the latter, first latch means for holding said actuating means out of engagement with said capstan and being released in response to the attainment of said second position by said support member, and second latch means which is engaged when said support member attains said second position to hold said presser member in said active position.

24. A magnetic recording and/or reproducing apparatus as in claim 23, further comprising means to release said second latch means for permitting the return of said presser member to said inactive position thereof in preparation for the return movement of said support member from said second position to said first position thereof.

25. A magnetic recording and/or reproducing apparatus as in claim 23, in which said actuating means for the presser member includes pivoted lever means engageable with said presser member to urge the latter in the direction toward said active position and a rotatable drive wheel peripherally engageable with said capstan and being eccentrically mounted on said lever means to provide first and second peripheral portions of the wheel at maximum and minimum distances, respectively, from the axis of rotation of the wheel, said first latch means is engageable with said lever means to dispose the latter for holding said wheel away from said capstan with said second peripheral portion of the wheel presented to said capstan and, when released, permits engagement of said wheel with the capstan so that the latter rotates said wheel and said lever means is rocked to a position corresponding to engagement of said first peripheral portion of the wheel with said capstan, and said second latch means engages said lever means in said rocked position of the latter.

26. A magnetic recording and/or reproducing apparatus according to claim 18, in which said reels are mounted at a level above the plane of rotation of said head, said support member is rotatable in a plane that is slanted with respect to said plane of rotation of the head, and, when said support member is turned to said second position thereof, said tape engaging member is located at a relatively low portion of said support member for causing the tape to extend helically on said peripheral portion of the drum.

27. A magnetic recording and/or reproducing apparatus as in claim 26, in which said plane of rotation of the head is slanted with respect to the planes of rotation of said reels so as to substantially bisect and angle included between the plane of rotation of said support member and the planes of rotaton of said reels.

28. A magnetic recording and/or reproducing apparatus as in claim 26, in which said tape engaging member is movable relative to said support member both in directions generally toward and away from the center of rotation of said support member and in directions generally perpendicular to said plane of rotation of the support member, and, at said first position of said support member, said tape engaging member is displaced upwardly away from said plane of rotation of the support member and away from the center of rotation of the latter for engagement with the tape between said reels mounted at said level above the plane of rotation of the head.

29. A magnetic recording and/or reproducing apparatus as in claim 28, in which said means for displacing said tape engaging member out of the guide path and for moving said tape engaging member into said guide path includes a cam member extending along at least part of the periphery of said support member and cam follower means connected with said tape engaging member and engaging said cam means at least when said support member is at and adjacent to said first position thereof.

30. A magnetic recording and/or reproducing apparatus as in claim 28, further comprising a cassette housing said reels and having an opening at which the tape between the reels is exposed, and said tape engaging member is in the form of an upstanding guide pin extending from movable arm means attached to said support member and disposed, in said first position of said support member, to extend said pin upwardly into said opening of the cassette for engaging the tape there exposed.

31. A magnetic recording and/or reproducing apparatus as in claim 30, further comprising a cassette holder including a carriage for receiving said cassette in a raised position of said carriage, and being movable downwardly to a lowered operating position at which said guide pin projects upwardly into said opening of the cassette carried by said carriage with said support member at said first position thereof.

32. A magnetic recording and/or reproducing apparatus as in claim 3, further comprising raising means for returning said carriage to said raised position thereof, and means to permit operation of said raising means only when said support member is at said first position thereof.

33. A magnetic recording and/or reproducing apparatus as in claim 31, further comprising selectively driven hubs mounted below said carriage of the cassette holder and projecting upwardly through the carriage for respectively engaging said take-up and supply reels when said carriage is in said lowered operating position, means for varying the spacing between said hubs to adapt the apparatus for use with respective sizes of cassettes, and locating means on said carriage and each cassette for positioning the latter properly to have its reels engaged by said hubs.

34. A magnetic recording and/or reproducing apparatus as in claim 33, in which said carriage includes a substantially horizontal support plate onto which said cassette is slidable in said raised position of the holder, and said locating means includes upstanding projections on said support plate and a slot in the bottom of each cassette to receive said projections during the sliding of the cassette onto said support plate.

35. A magnetic recording and/or reproducing apparatus comprising a holder for take-up and supply reels carrying a magnetic tape which extends between the reels, a cylindrical tape guide drum spaced from said reels, at least one rotary magnetic head moved in a path substantially coinciding with the periphery of said drum, a support ring extending around said drum and being mounted for rotation about the center of said ring which is eccentrically located with respect to the axis of said guide drum in the direction toward said holder whereby to provide a relatively large clearance between said drum and ring in said direction toward said holder, the plane of rotation of said ring being inclined so that said ring is relatively low at the portion thereof disposed between said guide drum and said holder, means for turning said support ring between first and second angularly spaced positions, a tape engaging member mounted on said ring for turning with the latter and being relatively widely spaced from said drum in both said first and second positions of the support ring, said tape engaging member being engageable with the tape between the reels when said ring is in said first position and drawing a tape loop from between the reels and wrapping one side of the loop about a portion of said periphery of the drum in response to movement of said ring from said first position to said second position, a plurality of guides spaced apart along said ring and, in moving along said relatively low portion of the ring, passing under said one side of the tape loop into said tape loop to engage the other side of the latter and hold said other side away from said drum, a rotated capstan disposed in said large clearance between said drum and said ring and located to be engageable by said tape between said tape engaging means and the portion of the tape wrapped about said drum when said ring is moved to said second position, pinch roller means carried by said ring to be moved adjacent said capstan with the tape therebetween when said ring is moved to said second position, and means for pressing said pinch roller means against said capstan when said ring attains said second position.

* * * * *